US012636802B2

(12) United States Patent
Petrelli

(10) Patent No.: US 12,636,802 B2
(45) Date of Patent: May 26, 2026

(54) SHAVING UNIT AND AN ELECTRIC SHAVER HAVING THE SHAVING UNIT

(71) Applicant: KONINKLIJKE PHILIPS N.V., Eindhoven (NL)

(72) Inventor: Mark Cornelis Petrelli, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 625 days.

(21) Appl. No.: 17/773,640

(22) PCT Filed: Nov. 13, 2020

(86) PCT No.: PCT/EP2020/081983
§ 371 (c)(1),
(2) Date: Aug. 24, 2022

(87) PCT Pub. No.: WO2021/099211
PCT Pub. Date: May 27, 2021

(65) Prior Publication Data
US 2022/0379504 A1 Dec. 1, 2022

(30) Foreign Application Priority Data
Nov. 19, 2019 (EP) .................................... 19210156

(51) Int. Cl.
*B26B 19/14* (2006.01)

(52) U.S. Cl.
CPC .................................. *B26B 19/146* (2013.01)

(58) Field of Classification Search
CPC ..... B26B 19/14; B26B 19/141; B26B 19/143; B26B 19/145; B26B 19/146
(Continued)

(56) References Cited

U.S. PATENT DOCUMENTS 2,900,720 A * 8/1959 Starre et al. ............ B26B 19/14 30/43.3
3,844,033 A * 10/1974 Yonkers .................. B26B 19/14 30/43.5
(Continued)

FOREIGN PATENT DOCUMENTS

CN 202878365 U 4/2013
EP 3608069 A1 * 2/2020 ............. B26B 19/14
(Continued)

OTHER PUBLICATIONS

International Search Report and Written Opinion Dated Feb. 18, 2021 for International Application No. PCT/EP2020/081983 Filed Nov. 13, 2020.

*Primary Examiner* — Jason Daniel Prone

(57) ABSTRACT

A shaving unit (12) has an assembly of at least two rotary hair-cutting units (13) and a supporting member (26) to which the hair-cutting units are connected. The assembly of the hair-cutting units and the supporting member can move linearly relative to a base portion (20) between a first, retracted, position and a second, extended, position. The supporting member is biased by a spring member (30) away from the base portion. The hair-cutting units each have an individual hair-collecting chamber and they are individually pivotable relative to the supporting member. The base portion comprises a coupling structure (44) by means of which the shaving unit can be releasably coupled to the main housing (15) of a shaving device.

15 Claims, 6 Drawing Sheets

(58) Field of Classification Search
USPC .......................................... 30/41.6, 43.4–43.6
See application file for complete search history.

(56) References Cited

U.S. PATENT DOCUMENTS 4,910,869 A * 3/1990 Labrijn ................. B26B 19/145 30/43.6
5,007,168 A * 4/1991 Messinger .............. B26B 19/14 30/43.6
6,145,200 A * 11/2000 Jorna .................... B26B 19/141 30/43.4
7,930,828 B2 * 4/2011 Brada ..................... B26B 19/14 30/43.6
8,844,141 B2 * 9/2014 Van Der Borst ..... B26B 19/145 30/43.6
9,009,978 B2 * 4/2015 Schneider ............... B26B 19/14 30/43.6
9,216,513 B2 * 12/2015 Brada ..................... B26B 19/14
9,592,614 B2 * 3/2017 Oosterhoff ............ B26B 19/146
9,649,772 B2 * 5/2017 Shimizu ................ B26B 19/146
9,713,876 B2 * 7/2017 Brada ................... B26B 19/143
9,827,684 B2 * 11/2017 Van Toor .............. B26B 19/145
RE47,538 E * 7/2019 Westerhof ............. B26B 19/145
10,357,890 B2 * 7/2019 Yan ....................... B26B 19/146
10,532,474 B2 * 1/2020 Julemont ................ B26B 19/14
RE48,352 E * 12/2020 Westerhof ............. B26B 19/145
10,933,545 B2 * 3/2021 Lap ....................... B26B 19/146
11,014,254 B2 * 5/2021 Nijdam ................. B26B 19/388
11,260,549 B2 * 3/2022 Lap ....................... B26B 19/145
11,267,145 B2 * 3/2022 Horowitz ................ B26B 19/14
11,465,301 B2 * 10/2022 Horowitz .............. B26B 19/145
11,732,883 B2 * 8/2023 Vugts ...................... B26B 19/38 362/613
11,806,884 B2 * 11/2023 Eijkelkamp ............. B26B 19/14
11,816,976 B2 * 11/2023 Vugts .................... B26B 19/388
11,833,699 B2 * 12/2023 Petrelli ................. B26B 19/145
12,090,674 B2 * 9/2024 Petrelli ................... B26B 19/14
12,220,827 B2 * 2/2025 Darwinkel ............ B26B 19/146
2004/0237310 A1 * 12/2004 Shiba ...................... B26B 19/10 30/43.92
2010/0011589 A1 * 1/2010 Van Der Borst ..... B26B 19/143 30/43.6
2011/0030220 A1 2/2011 Shimizu
2011/0173815 A1 7/2011 Koike
2011/0308088 A1 12/2011 Brada
2018/0222066 A1 * 8/2018 Julemont .............. B26B 19/141
2021/0069920 A1 * 3/2021 Kulshreshtha ........ B26B 19/145
2022/0016793 A1 * 1/2022 Wang ...................... B26B 19/14
2022/0395994 A1 * 12/2022 Qiu ....................... B26B 19/146
2022/0402153 A1 * 12/2022 Darwinkel ............ B26B 19/145
2023/0020301 A1 * 1/2023 De Vries ............... B26B 19/146
2023/0029552 A1 * 2/2023 Joosten ................. B26B 19/146
2023/0132864 A1 * 5/2023 Iwakura ................ B26B 19/143 30/43.5
2024/0173879 A1 * 5/2024 Varghese .............. B26B 19/146
2024/0316806 A1 * 9/2024 Van Den Berg ...... B26B 19/146
2024/0326270 A1 * 10/2024 Cleppe .................. B26B 19/146

FOREIGN PATENT DOCUMENTS

JP S5620486 A 2/1981
WO 2010/103425 A1 9/2010
WO 2018060901 A1 4/2018
WO 2018099098 A1 6/2018
WO 2018/138172 A1 8/2018
WO 2018/138302 A1 8/2018

* cited by examiner

SHAVING UNIT AND AN ELECTRIC SHAVER HAVING THE SHAVING UNIT

CROSS REFERENCE TO RELATED APPLICATIONS

This application is the U.S. National Phase application under 35 U.S.C. § 371 of International Application No. PCT/EP2020/081983 filed Nov. 13, 2020, which claims the benefit of European Patent Application Number 19210156.6 filed Nov. 19, 2019. These applications are hereby incorporated by reference herein.

FIELD OF THE INVENTION

This invention relates to shaver units, and in particular to shaving units having at least two hair-cutting units each having an external cutting member with a plurality of hair-entry openings and a rotatable internal cutting member.

BACKGROUND OF THE INVENTION

It is known to form a set of hair-cutting units into an assembly, and to mount that assembly of hair-cutting units with an elastic suspension arrangement. This suspension provides a controlled force against the skin in use, to improve the shaving performance and the comfort for the user.

A linear guiding system may for example be used which biases the assembly outwardly towards the skin. The stroke of the suspension does not need to be very long, for example 3 mm is sufficient.

It is also known to provide hair-cutting units with some independence, for example with independent hair-collecting chambers and with independent pivoting of each hair-cutting unit about a respective local pivot axis. Each hair-cutting unit may then individually be biased towards the skin, to allow the assembly of hair-cutting unit to adapt to the contour of the user's face.

There remains a need however for a shaving unit which provides improved shaving comfort and effectiveness.

SUMMARY OF THE INVENTION

The invention is defined by the claims.

According to examples in accordance with an aspect of the invention, there is provided a shaving unit for use in a shaving device, the shaving unit comprising:

- a base portion comprising a coupling structure by means of which the shaving unit is releasably couplable to a main housing of the shaving device;
- at least two hair-cutting units; and
- a supporting member centrally arranged between the at least two hair-cutting units and having a central axis,
- wherein each hair-cutting unit is connected to the supporting member and comprises:
  - an external cutting member having a plurality of hair-entry openings;
  - an internal cutting member which is rotatable relative to the external cutting member;
  - a cutting unit housing supporting the external and internal cutting members of the hair-cutting unit and accommodating an individual hair-collecting chamber of the hair-cutting unit which is separate from the hair-collecting chambers of the other hair-cutting units; and
  - a pivot axis about which the cutting-unit housing is pivotable relative to the supporting member independently from the cutting-unit housings of the other hair-cutting units, characterized in that the shaving unit further comprises:

- a linear guiding arrangement enabling the supporting member to linearly move relative to the base portion in a movement direction parallel to the central axis of the supporting member between a first retracted position and a second extended position; and
- a spring member for biasing the supporting member away from the base portion in the movement direction.

This shaving unit provides a supporting member to which the hair-cutting units are connected, so that the hair-cutting units may be biased by the supporting member as a combined assembly. A linear guiding arrangement implements the movement of the supporting member. In addition to the movement of the combined assembly, each hair-cutting unit has independent pivoting about a pivot axis so that the assembly can adapt to the contours of the user's face. In this way, a comfortable and close shave can be achieved with control of the force applied.

The invention integrates an elastic suspension system into the shaving unit, which can selectively be coupled to the main housing of the shaving device by means of the coupling structure. The elastic suspension system can thus be designed and optimized specifically for the shaving unit, and other functional attachments, which can be coupled to the main housing instead of the shaving unit, can be designed without any elastic suspension system or with an elastic suspension system having different characteristics. The suspension system is integrated in a practical way into the shaving unit by means of the linear guiding arrangement, which enables the supporting member to linearly move relative to the base portion in the movement direction, and the spring member which biases the supporting member away from the base portion.

The shaving unit may further comprise a drive unit for driving the internal cutting members of the hair-cutting units into rotation, and wherein the drive unit comprises, for each of the hair-cutting units, an individual drive spindle which is rotationally supported by the base portion and coupled to the internal cutting member of the respective hair-cutting unit.

The hair-cutting units thus also have independent drive spindles. These may for example extend and retract to follow the movement of the supporting member.

The drive unit is preferably releasably couplable to a driving actuator in the main housing of the shaving device by means of a single driven coupling member which is accommodated in the coupling structure, and wherein the base portion comprises a transmission unit for coupling the single driven coupling member to each of the individual drive spindles.

Thus, although individual drive spindles are used, a single driven coupling member is used, and a transmission unit provides a coupling to the individual drive spindles.

For each hair-cutting unit:

- the internal cutting member for example comprises a plurality of cutting elements each having a cutting edge;
- during rotation of the internal cutting member, the cutting edges follow an annular cutting path about an axis of rotation of the internal cutting member; and
- seen in an axial direction relative to the central axis, the pivot axis is located between the central axis and the annular cutting path.

Thus, each hair-cutting unit can rock inwardly and outwardly about an axis close to the central axis. This enables a significant amount of change to the contour defined by the combination of the hair-cutting units.

The linear guiding arrangement for example comprises:

- a guide shaft mounted in a fixed position to the base portion and having a shaft axis extending parallel to the movement direction of the supporting member;
- a set of guide elements, each mounted in a fixed position to the base portion and each being radially spaced from the shaft axis of the guide shaft;
- a guide bush mounted in a fixed position to the supporting member and arranged for sliding motion over the guide shaft parallel to the shaft axis for enabling linear movement of the supporting member relative to the base portion in the movement direction; and
- a set of guide members, each mounted in a fixed position to the supporting member and each being arranged for engaging a respective one of the set of guide elements to allow linear movement of the supporting member relative to the base portion in the movement direction,
- wherein, seen in the movement direction, the guide shaft and the guide bush are arranged at a distance from the set of guide elements and the set of guide members.

This provides a particular design for the vertical elastic suspension arrangement by which the hair-cutting units are biased towards the skin. To allow for linear translation of the shaving unit but also (limited) rotation about an axis perpendicular to the central axis (i.e. in the x-y plane), two guiding arrangements are provided. The first guiding arrangement (the shaft and guide bush) is a linear sliding arrangement with no rotational control. The second guiding arrangement (the guide members and guide elements) also allows linear sliding but it also prevents rotation about the central axis. The second guiding arrangement is located radially spaced from the central axis. In this way, rotational play is reduced, despite the possible large diameter of the shaving unit. The combination of the two guiding arrangements enables shear forces as well as axial forces to be tolerated. The arrangement is simple to manufacture with few components and without the need for complex bearing or spring designs.

The guide members are for example each arranged for engaging a respective one of the set of guide elements to also allow rotation of the supporting member about axes in a plane perpendicular to the central axis. The first guiding arrangement (the guide shaft and guide bush) thus does not need to have a long length, because rocking about the point where the guide bush surrounds the shaft is permitted. This rocking causes the described rotation about an axis perpendicular to the central axis.

Thus, the guide bush and the guide shaft mutually engage such as to allow rocking of the guide bush relative to the guide shaft and thereby to allow said rotation of the supporting member about axes in a plane perpendicular to the central axis.

The guide elements may each comprise a channel extending parallel to the movement direction, and the guide members each comprise a curved projection located within the channel of a respective one of the guide elements, wherein each curved projection is arranged in the associated channel such that motion of the curved projection in tangential directions relative to the central axis is prevented.

While the tangential movement (i.e. rotation about the central axis) is prevented, by using a curved surface, the rocking mentioned above is permitted as well as linear sliding with no rocking. The projections for example each comprise a ball.

Each channel may be formed between opposing side surfaces of a pair of guiding walls, and at least one guiding wall has a stop element, and wherein the supporting member comprises an abutment element for engagement with the stop element to define the second, extended, position of the supporting member relative to the base member.

Thus, the linear displacement of the supporting member is limited by the second guiding arrangement (the guide elements and the guide members).

The guide elements may be located in a bottom part of the base portion and the guide bush is positioned centrally between the hair-cutting units at a distance, in the movement direction, from the bottom part of the base portion. This separation of the positions along the movement direction axis enables the individual elements to be compact but create an overall guide which has a small about of play and which can tolerate the shear forces and axial forces encountered during shaving.

A set of at least three guide elements may be provided arranged at regular angular intervals about the central axis.

There may also be at least three rotary hair-cutting units, and a transmission unit may be provided (as outlined above) which comprises at least three gear wheels, each gear wheel being associated with a respective drive spindle for a respective one of the rotary hair-cutting units, and the gear wheels being disposed around the central axis, wherein each guide element is positioned between a respective one of adjacent pairs of the gear wheels.

This provides a compact arrangement in which the guide elements do not take up additional space, in that there is already space between (circular) gear wheels.

The base portion may comprises a lower housing and a frame attached to the lower housing, wherein the frame comprises a receiving channel for receiving the guide shaft, and also comprises the set of guide elements. Thus, there are only a few components needed because some functions are implemented by individual components.

The set of guide elements are for example arranged at feet of the frame by means of which the frame connects to the lower housing, and the guide shaft projects out of the receiving channel beyond a top of the frame.

The invention also provides an electric shaver comprising:

- a main housing which houses an electric motor; and
- a shaving unit as defined above coupled to the main housing.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
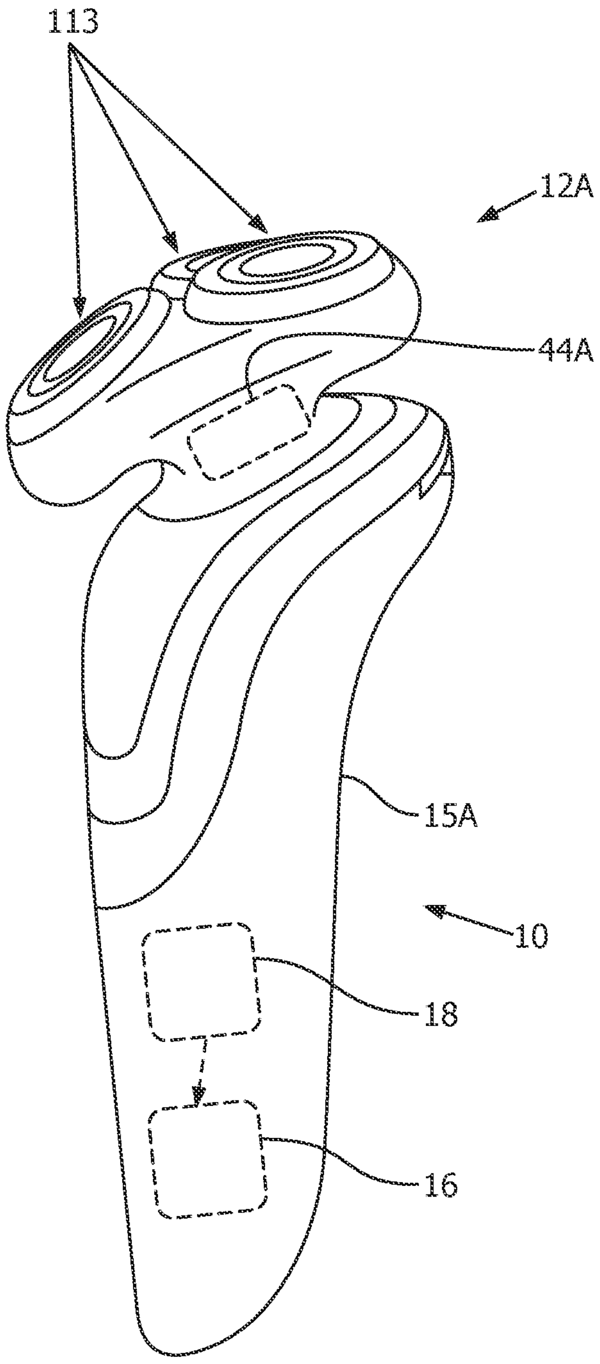
FIG. 1 PRIOR ART
FIG. 1 shows a conventional electric shaving device.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a shaving unit which has an assembly of at least two rotary hair-cutting units and a supporting member which connects to the assembly of hair-cutting units. The supporting member can move linearly relative to a base portion between relative a first, retracted, position and a second, extended, position. The supporting member is biased by a spring member away from the base portion. The hair-cutting units each have an individual hair-collecting chamber and they are individually pivotable relative to the supporting member.

FIG. 1 shows a conventional electric shaving device 10, comprising a conventional shaving unit 12A releasably connected to a main housing 15A by a via coupling structure 44A. In this example, shaving unit 12A has a set of three rotary cutters 113. A driving actuator 16, i.e. motor, is arranged in the main housing to enable driving of the rotary cutters 113. Other functional units may be connected to the main housing instead of the rotary shaving unit. This invention relates in particular to the design of the shaving unit. A controller 18 drives the shaving unit.

The general functional operation of the shaver is well known and will not be described in detail in this application.

Figure 2:
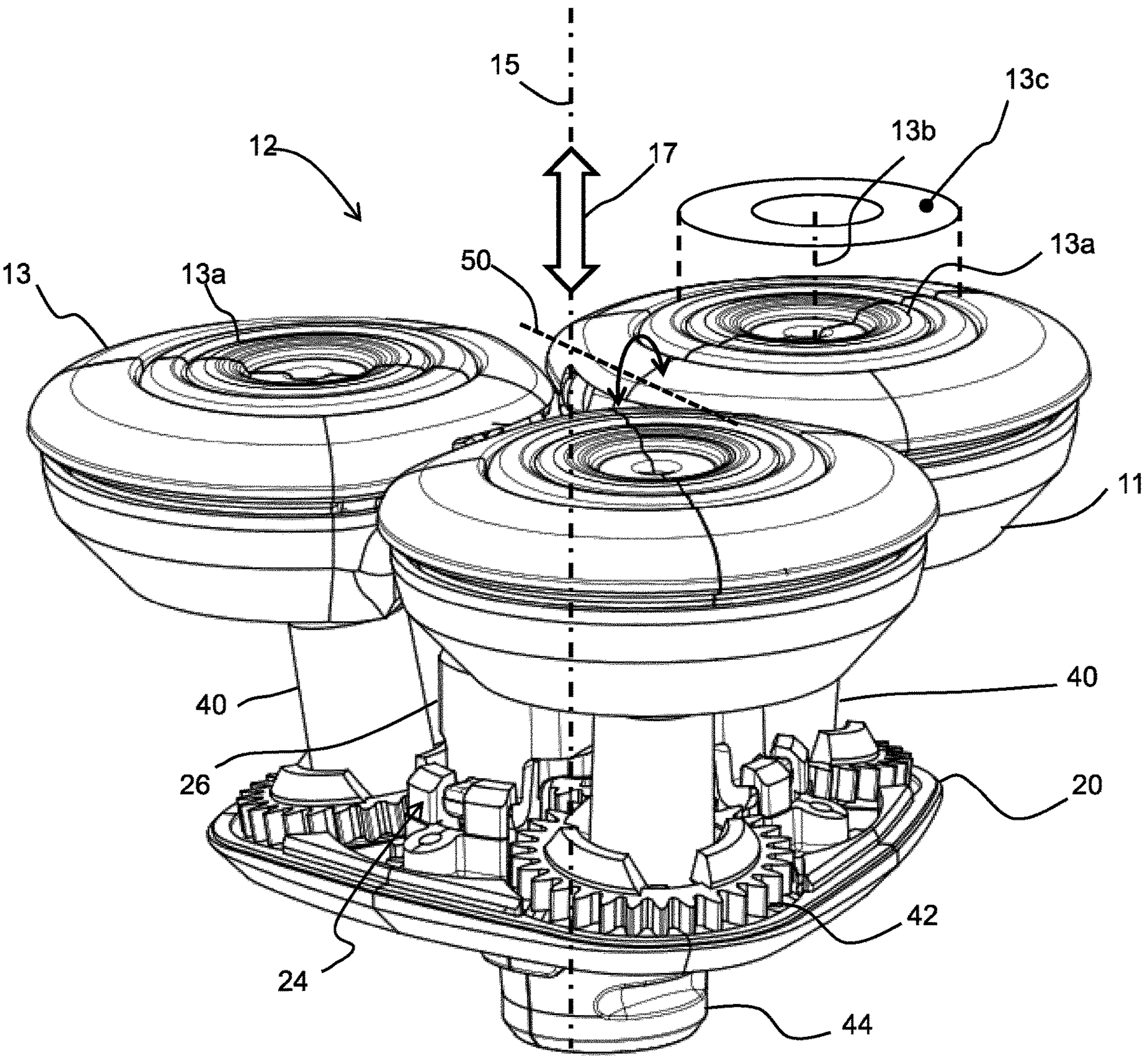
FIG. 2 shows one example of shaving unit in accordance with the invention.
Figure 3:
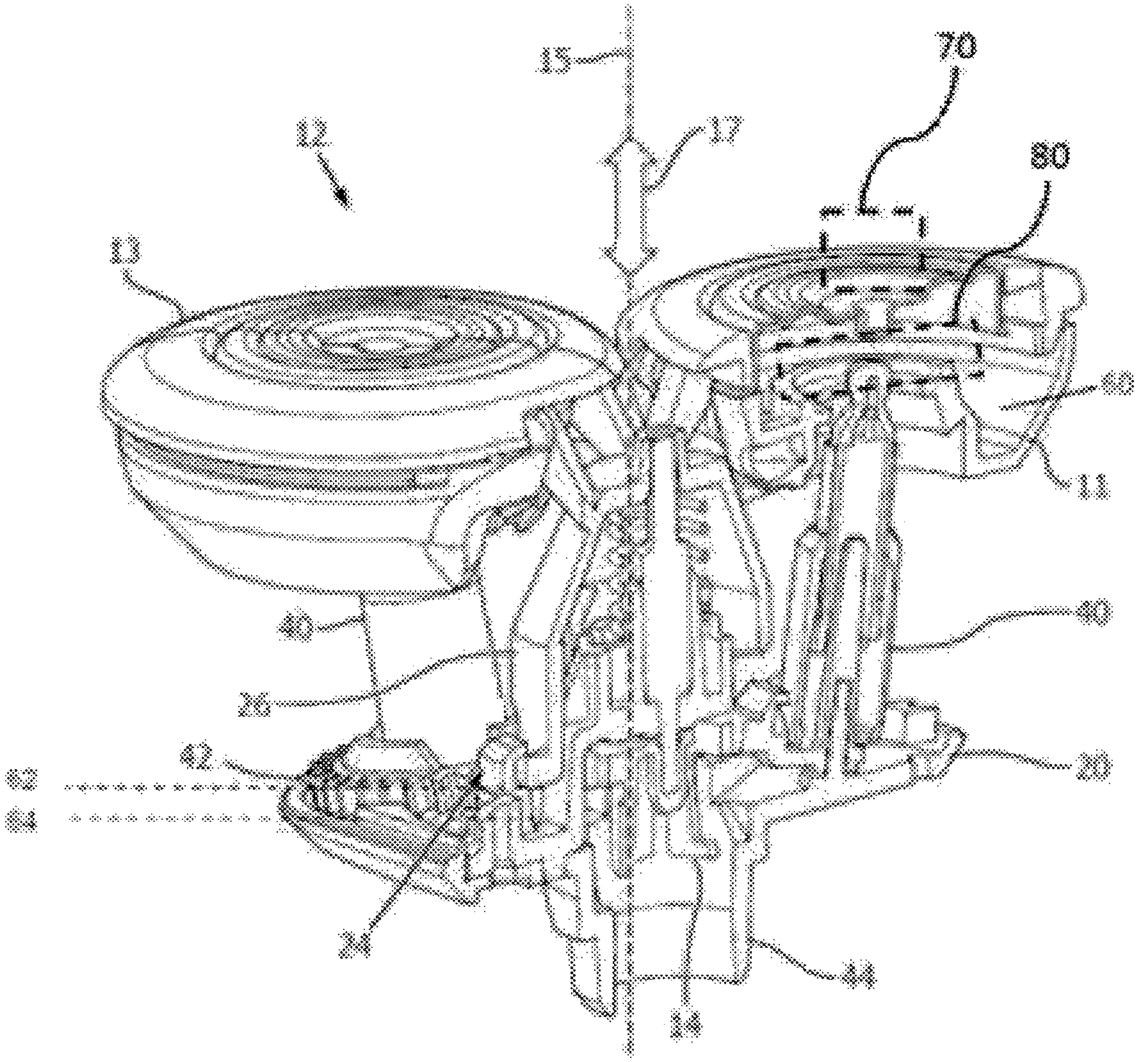
FIG. 3 shows a cross section through the example of FIG. 2.

FIG. 2 shows one example of a shaving unit in accordance with the invention. FIG. 3 shows a cross section through the image of FIG. 2.

The shaving unit 12 has a base portion 20 which includes a coupling structure 44 by means of which the shaving unit is releasably couplable to the main housing 15 of the shaving device 10.

Three hair-cutting units 13 are shown, although there may be two or more than three. A supporting member 26 is centrally arranged between the hair-cutting units 13 and has a central axis 15.

Each hair-cutting unit 13 is connected to the supporting member 26 so that they form an assembly. The supporting member is biased outwardly (i.e. towards the skin).

Each individual hair-cutting unit 13 has an external cutting member 13*a* having a plurality of hair-entry openings 70. Beneath the external cutting member 13*a* is an internal cutting member 80 which is rotatable relative to the external cutting member 13*a*. Together, they define a conventional rotary cutter.

The internal cutting members comprise a plurality of cutting elements each having a cutting edge. During rotation of the internal cutting member (with the external cutting member static), the cutting edges follow an annular cutting path 13*c* about an axis of rotation 13*b* of the respective internal cutting member. One such cutting path is represented in FIG. 2, but projected above the external cutting member 13*a* simply to make it visible. The cutting path corresponds to the annular area over which the cutting edges move. The inner diameter of the cutting path thus corresponds to the diameter of the circular path followed by the radially innermost end point of the cutting edges (or of the radially innermost cutting edge in case the cutting edges have different radial positions), and the outer diameter of the cutting path thus corresponds to the diameter of the circular path followed by the radially outermost end point of the cutting edges (or of the radially outermost cutting edge in case the cutting edges have different radial positions).

Each hair-cutting unit is also pivotable independently about a respective pivot axis 50 relative to the supporting member 26. One such pivot axis is schematically shown in FIG. 2. The pivot axis 50, as seen in an axial direction relative to the central axis 15 (i.e. looking down from the top of FIGS. 2 and 3 along the central axis 15), is located between the central axis 15 and the annular cutting path 13*c*. Thus, each hair-cutting unit can rock inwardly and outwardly about a tangential axis close to the central axis. This enables a significant amount of change to the contour defined by the combination of the hair-cutting units. The supporting member 26 implements the rotation axes for this pivoting movement. This is explained in further detail below.

Each cutting unit has its own housing 11 supporting the external and internal cutting members of the hair-cutting unit 13. This housing accommodates an individual hair-collecting chamber 60 of the hair-cutting unit 13. Thus, there are separate hair-collecting chambers for each of the hair-cutting units 13.

The shaving unit has a drive unit for driving the internal cutting members of the hair-cutting units 13 into rotation. The drive unit comprises, for each of the hair-cutting units, an individual drive spindle 40 which is rotationally supported by the base portion 20 and coupled to the internal cutting member of the respective hair-cutting unit 13. The hair-cutting units thus have independent drive spindles and the housings 11 are over these drive spindles. The drive spindles each have a head which projects into an opening in a bottom wall of the housing 11 and then into engagement with the rotational internal cutting members.

Each drive spindle has two telescopic parts which are spring loaded so that each hair-cutting unit is independently biased outwardly as well as the overall assembly being outwardly biased by the supporting member 26. One drive spindle is shown in cross section in FIG. 3, but the spring is omitted. The drive spindles 40 also urge the hair-cutting units into a pivoted end position about their respective rotation axes 50 in which the outer portion of their periphery rim is outwardly raised relative to the inner portion of their periphery.

The drive unit is releasably couplable to the driving actuator 16 (motor) in the main housing 15 of the shaving device by means of a single driven coupling 14 which is accommodated in the coupling structure 44. The base portion 20 comprises a transmission unit for coupling the single driven coupling member 14 to each of the individual drive spindles 40. This transmission unit comprises an arrangement of cogs 42. Thus, although individual drive spindles are used, a single driven coupling member 14 is used, and a transmission unit provides a coupling to the individual drive spindles.

The supporting member 26 is coupled to the base portion 20 by a linear guiding arrangement which enables the supporting member 26 to linearly move relative to the base portion 20 in a movement direction parallel to the central axis 15, as shown by arrow 17. There is a first retracted position 64 and a second extended position 62. The supporting member is biased by a spring member for biasing the supporting member 26 away from the base portion 20 in the movement direction towards the second extended position 62. The linear guiding arrangement is partially shown in FIGS. 2 and 3, but it is described below with reference to figures showing different views of the components.

The shaving unit provides a supporting member to which the hair-cutting units are connected, so that the hair-cutting units may be biased by the supporting member as a combined assembly. A linear guiding arrangement implements the movement of the supporting member. In addition to the movement of the combined assembly, each hair-cutting unit has independent pivoting about a pivot axis so that the assembly can adapt to the contours of the user's face. In this way, a comfortable and close shave can be achieved.

The invention provides a practical way to implement an elastic suspension for the assembly of the hair-cutting units. The elastic suspension is integrated in a practical manner into the shaving unit, i.e. the unit which can selectively be coupled to the main housing and can be exchanged by a different type of functional unit (e.g. a beard trimmer or a facial brush). The elastic suspension is thus designed specifically for the shaving unit, and other functional attachments can be used without the suspension function.

One particular design of the linear guiding arrangement (as partly shown in FIGS. 2 and 3) will now be described in more detail.

It is challenging to implement a suspension system in this general type of device. A routine approach could be to mount a carrier for the assembly of hair-cutting units along a support, with a dry friction coupling between them. A problem then arises that the coupling must cope with the forces on the moving parts. These forces are shear forces as a result of the assembly gliding laterally over the skin as well as central axial forces resulting from the pressure applied to the skin during shaving. These forces can have a locking effect on the movement. To provide a well controlled linear sliding as well as to prevent this locking issue, a long coupling is needed. However, this takes up undesired space in the arrangement.

Another issue is play, in particular rotational play, since the diameter of the shaving unit is relatively large. A small play in the linear guiding system will be multiplied in the shaving unit. The linear guiding system also needs to be sufficiently stiff.

Figure 4:
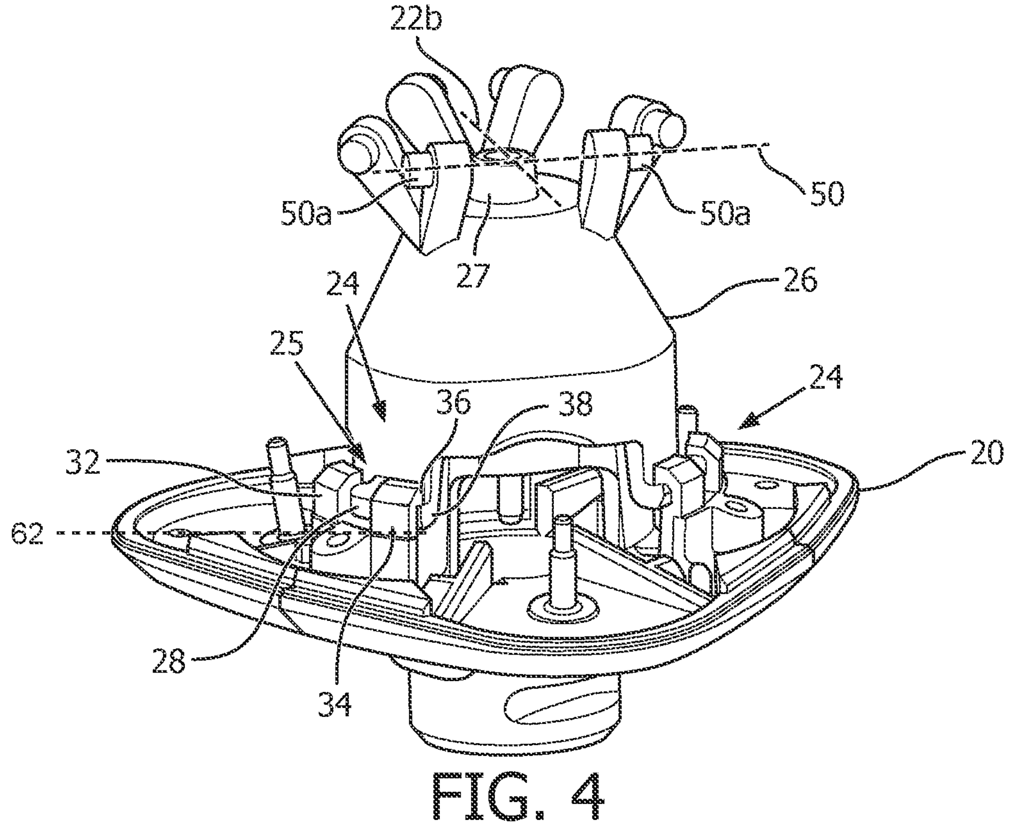
FIG. 4 shows a view of the base portion and the supporting member, with the drive spindles removed.
Figure 5:
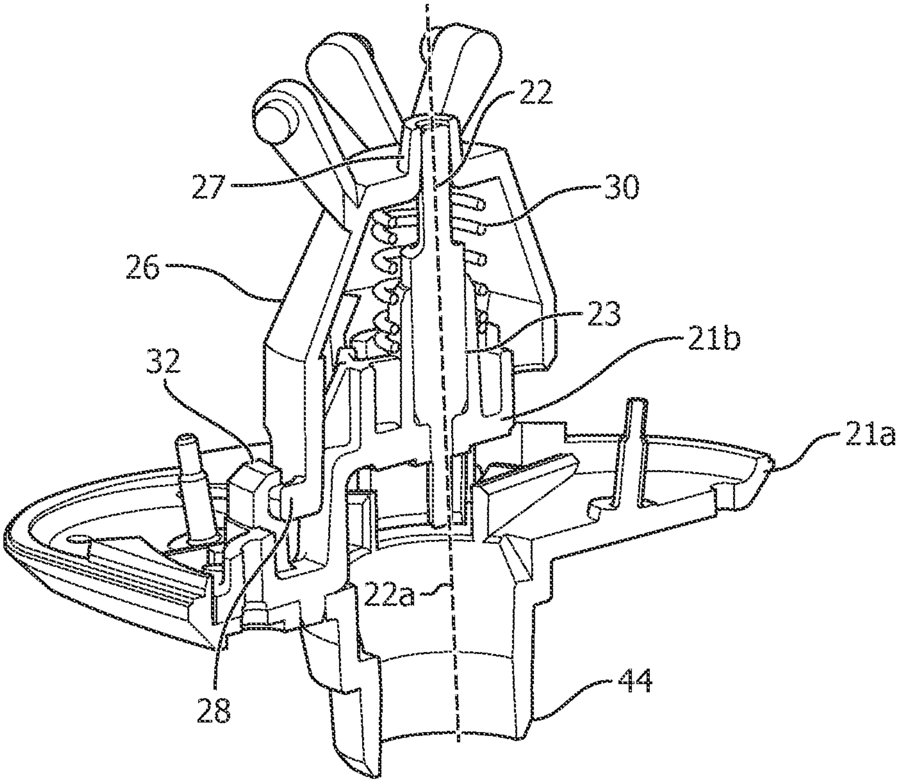
FIG. 5 shows a cross section through the arrangement shown in FIG. 4.

FIG. 4 shows a view of the base portion 20 and the supporting member 26, with the drive spindles removed. FIG. 5 shows a cross section through the arrangement shown in FIG. 4.

The linear guiding arrangement comprises a guide shaft 22 mounted in a fixed position to the base portion 20 and having a shaft axis 22*a* extending parallel to the movement direction 17 of the supporting member and hence parallel to the central axis 15. The supporting potion has a guide bush 27 positioned around the guide shaft 22 so that the guide bush 27 may slide over the guide shaft 22 thereby enabling linear movement of the supporting member 26 relative to the base portion in the movement direction. The guide bush 27 is mounted at a fixed position to the supporting member 26.

The guide bush 27 and guide shaft 22 together form a first guiding arrangement. This first guiding arrangement is a very short linear bearing. It limits the degrees of freedom in the x- and y-directions (i.e. in a plane perpendicular to the axis 22*a*) and is free for rotation and translation with respect to the z-axis (parallel to the axis 22*a*). The bearing is sufficiently short that it also allows some rotation around x- and y-directions.

Thus, the bearing allows rotation of the supporting member about axes in a plane perpendicular to the axis 22*a*. One such rotation axis is shown as 22*b*. In this way, rocking about the point where the guide bush surrounds the shaft is permitted.

FIG. 4 also shows three pairs of pins 50*a* provided on the supporting member 26. Each pair of pins 50*a* engages a corresponding pair of recesses (not shown) provided in the cutting-unit housing 11 of a respective one of the three hair-cutting units 13. Via the pins 50*a*, the hair-cutting units 13 are connected to the supporting member 26. Each pair of pins 50*a* defines the pivot axis 50 about which the cutting-unit housing 11 of the respective hair-cutting unit 13 is pivotable, together with its associated internal and external cutting members, relative to the supporting member 26 independently from the cutting-unit housings 11 of the other hair-cutting units 13.

There is also a second guiding arrangement formed by a set of guide elements 24 and guide members 28. The guide elements 24 are each mounted in a fixed position to the base portion 20 and each being radially spaced from the shaft axis 22*a* of the guide shaft 22. In the example shown, there are three guide elements 24 disposed around the axis 22*a*.

The guide members 28 are mounted in a fixed position to the supporting member 26 and each is arranged for engaging a respective one of the set of guide elements 24 to allow linear movement of the supporting member 26 relative to the base portion in the movement direction.

The coupling between the guide shaft 22 and the guide bush 23 is arranged at a distance from the set of guide elements 24 and the set of guide members 28.

The guide elements 24 each comprise a channel 25 extending parallel to the movement direction, and the guide members 28 each comprise a curved projection, in particular a ball, located within the channel 25 of a respective one of the guide elements 24. Each ball is arranged in the associated channel such that motion of the ball in tangential directions relative to the axis 22*a* is prevented. However, the rocking described above is permitted in that different balls can be located at different positions along their respective channel. Note that this rocking (rotation around x- and y-directions) will be accompanied by a small amount of horizontal translation. Linear sliding with no rocking is also enabled.

Each channel 25 is formed between opposing side surfaces of a pair of guiding walls 32, 34. The guiding walls (or one of them) have a stop element 36 and the supporting member 26 has an abutment element 38 for engagement with the stop element 36 to define the second extended position 62 of the supporting member relative to the base member.

This provides a particular design for the vertical elastic suspension arrangement by which the hair-cutting units are biased towards the skin. To allow for linear translation of the shaving unit but also (limited) rotation about an axis perpendicular to the central axis (i.e. in the x-y plane), two guiding arrangements are provided. The first guiding arrangement (the guide shaft and guide bush) is a linear sliding arrangement with no rotational control. The second guiding arrangement (the guide members and guide elements) also allows linear sliding but it also prevents rotation about the central axis. The second guiding arrangement is located radially spaced from the central axis. In this way, rotational play is reduced, despite the possible large diameter of the shaving unit. The combination of the two guiding arrangements enables shear forces as well as axial forces to be tolerated. The arrangement is simple to manufacture with few components and without the need for complex bearing or spring designs.

Thus, this combination of guiding arrangements can compensate for some misalignment of the two guiding systems (in the x- and y-directions), such as resulting from production errors or tolerances.

If the system is radially loaded it will deform. This will result in a misalignment of the two systems in the x- and/or y-directions and in misalignment of the z-axis of the guide bush 27 and the z-axis of the shaft 22. The design of the two guiding arrangements tolerates this deformation.

The first guiding arrangement has two fixed degrees of freedom (translation in the x- and y-directions is not permitted). The second guiding arrangement can tilt and pivot around any axis in a plane perpendicular to the axis 22*a*. With the three balls in their channels, the center of this system is determined (in the x- and y-directions).

The balls may have any suitable curved surface, to prevent interlocking of a ball in its channel. Practically, a curved surface is good enough but a spherical ball may be used.

The spacing (along the axis 22*a*) between the first and second guiding arrangements is advantageous. It gives less sensitivity to misalignment. The linear guiding function is determined by the axis through the two centers of the first and second guiding arrangements. By making the distance between these points relatively large, the error in the linear guiding function is small.

The separation into separate guiding arrangements also enables torques around the x- and y-axes to be withstood. The larger the distance, the smaller the forces.

The result is that the guiding system will not lock and has hardly any notable play in any direction (apart from the intended z-direction). Furthermore, the only relative high precision parts are the three balls and their channels, and the guide bush and the guide shaft. These parts are easy to make with small tolerances because the dimensions are small, and they can be made in one part of a mold.

To provide the desired spatial separation discussed above, the guide elements 24 are located in a bottom part of the base portion 20 and the guide bush 27 (in particular the point where it couples to the guide shaft 22) is positioned centrally between the hair-cutting units at a distance, in the movement direction, from the bottom part of the base portion.

The cross section of FIG. 5 shows more clearly the guide shaft 22 and the short guide bush 27. It also shows that the base portion 20 comprises a lower housing 21*a* and a frame 21*b* attached to the lower housing 21*a*. The frame 21*b* comprises a receiving channel 23 for receiving the guide shaft 22, and also comprises the set of guide elements 24. Thus, there are only a few components needed because in some cases multiple functions are implemented by individual components.

FIG. 5 additionally shows the spring member 30 for biasing the supporting member 26 away from the base portion 20 in the movement direction.

Figure 6:
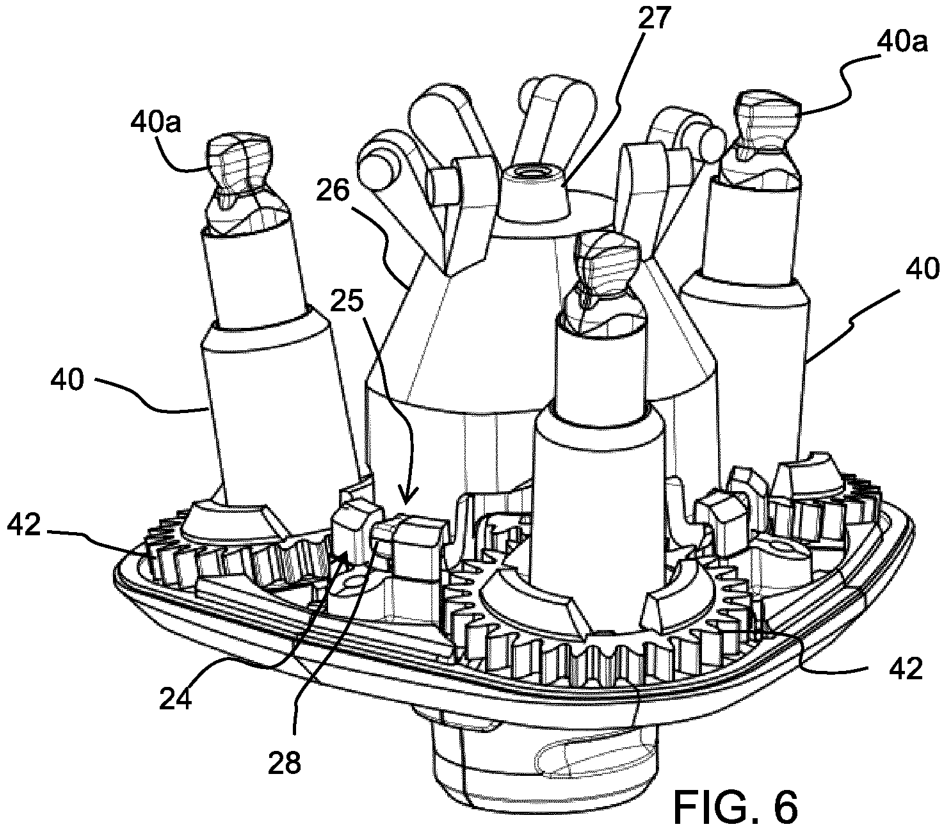
FIG. 6 shows the arrangement of FIG. 4 including the drive spindles.

FIG. 6 shows the arrangement of FIG. 4 including the drive spindles 40. The drive spindles each have a drive head 40*a*. The transmission unit for driving the drive spindles comprises gear wheels 42 as mentioned above, each gear wheel 42 being associated with a respective drive spindle for a respective one of the rotary hair-cutting units. The gear wheels 42 are disposed around the central axis. Each guide element 24 is positioned between a respective one of adjacent pairs of the gear wheels 42.

This provides a compact arrangement in which the guide elements 24 do not take up additional space, in that there is already space between (circular) gear wheels 42.

Figure 7:
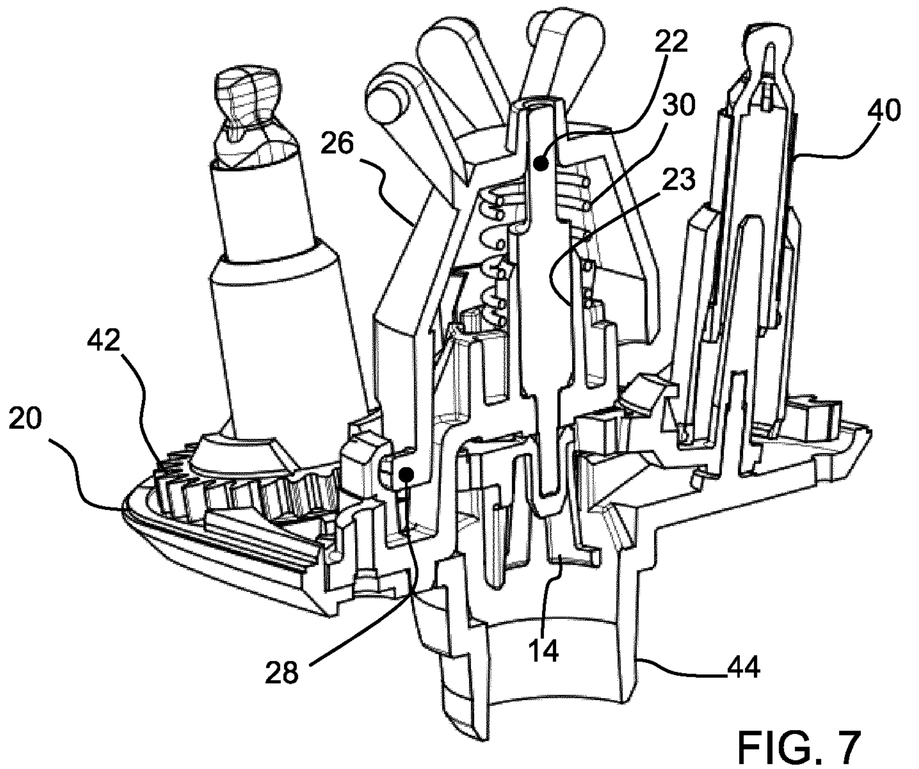
FIG. 7 shows a cross section through the arrangement shown in FIG. 6.

FIG. 7 shows a cross section through the arrangement shown in FIG. 6.

Figure 8:
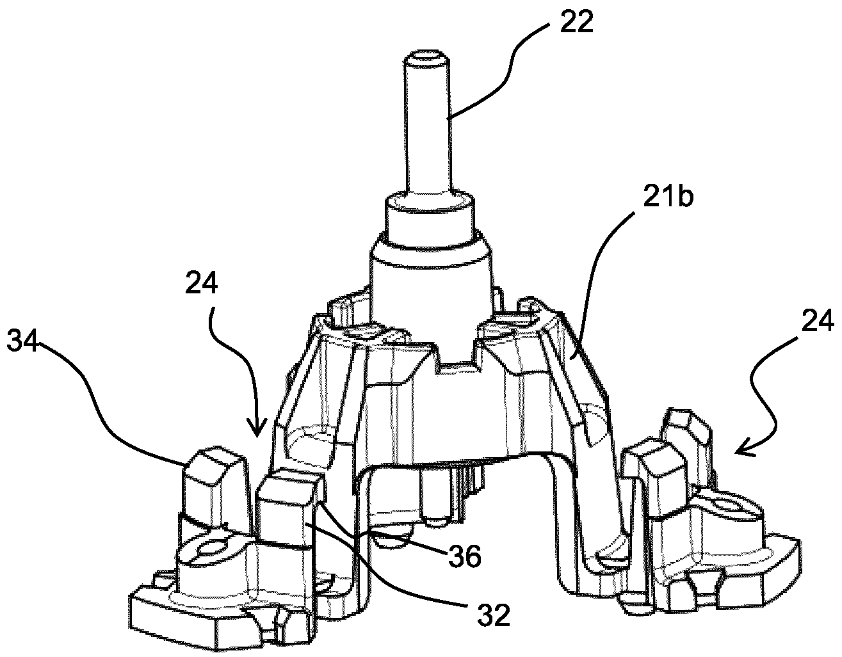
FIG. 8 shows the frame of the base portion more clearly.

FIG. 8 shows the frame 21*b* of the base portion more clearly. The set of guide elements 24 is shown arranged at feet of the frame 21*b* by means of which the frame connects to the lower housing 21*a*. The guide shaft 22 projects out of the receiving channel 23 beyond a top of the frame 21*b*. The guide shaft may be a metal rod.

Figure 9:
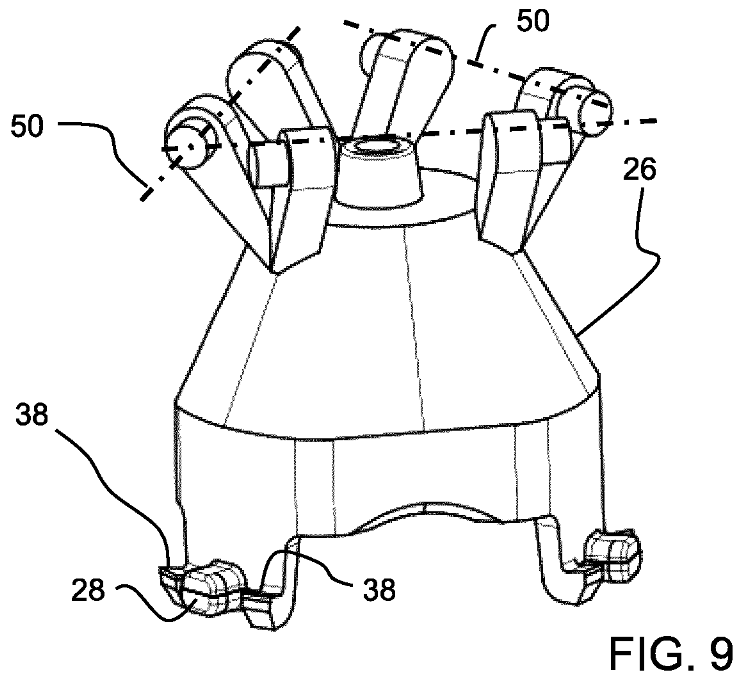
FIG. 9 shows the supporting member more clearly.

FIG. 9 shows the supporting member 26 more clearly. It shows how the pins define the pivot axes 50.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A shaving unit for use in a shaving device, the shaving unit comprising:

a base portion comprising a coupling structure for coupling the shaving unit to a main housing of the shaving device;

at least two hair-cutting units each having a hair-collecting chamber;

a supporting member centrally arranged between the at least two hair-cutting units and having a central axis that extends centrally through the supporting member to the coupling structure, wherein each of the at least two hair-cutting units is connected to the supporting member and is configured to accommodate an external cutting member having a plurality of hair-entry openings and an internal cutting member which is rotatable relative to the external cutting member, wherein each of the at least two hair-cutting units comprises:

a cutting unit housing configured to support the external and internal cutting members of a respective hair-cutting unit of the at least two hair-cutting units, wherein each of the cutting-unit housings is pivotably connected to the supporting member independently from the cutting-unit housing of each other hair-cutting unit and each connection defines a corresponding pivot axis;

a guide shaft mounted in a fixed position to the base portion and having a shaft axis extending parallel to the movement direction of the supporting member;

a set of guide elements, each of the guide elements mounted in a fixed position to the base portion and each being radially spaced from the shaft axis of the guide shaft;

a guide bush mounted in a fixed position to the supporting member and arranged for a sliding motion over the guide shaft parallel to the shaft axis for enabling linear movement of the supporting member relative to the base portion in the movement direction;

a set of guide members, each of the guide members mounted in a fixed position to the supporting member and each of the guide members being arranged for engaging a respective one of the set of guide elements to allow linear movement of the supporting member relative to the base portion in a movement direction parallel to the central axis of the supporting member between a first retracted position and a second extended position; wherein, seen in the movement direction, the guide shaft and the guide bush are arranged at a distance from the set of guide elements and the set of guide members; and a spring member positioned between the supporting member and the base portion for biasing the supporting member away from the base portion in the movement direction towards the second extended position.

2. The shaving unit as claimed in claim 1, further comprising for the each of the hair-cutting units, an individual drive spindle which is rotationally supported by the base portion and coupled to the internal cutting member of the respective hair-cutting unit.

3. The shaving unit as claimed in claim 2, comprising a single driven coupling member which is accommodated in the coupling structure, and wherein the base portion comprises a transmission unit for coupling the single driven coupling member to the individual drive spindle.

4. The shaving unit as claimed in claim 1, wherein the internal cutting member of each of the at least two hair-cutting units during operation follows an annular cutting path about an axis of rotation of the internal cutting member; and seen in an axial direction relative to the central axis, the pivot axis is located between the central axis and the annular cutting path.

5. The shaving unit as claimed in claim 1, wherein each of the guide members is arranged for engaging the respective one of the set of guide elements to also allow rocking of the supporting member about an axes in a plane perpendicular to the central axis.

6. The shaving unit as claimed in claim 5, wherein the guide bush and the guide shaft mutually engage such as to allow rocking of the guide bush relative to the guide shaft and thereby to allow said rocking of the supporting member about the axes in the plane perpendicular to the central axis.

7. The shaving unit as claimed in claim 5, wherein each of the guide elements comprises a channel, and each of the guide members comprises a curved projection located within the channel of the respective one of the guide elements, wherein each of the curved projections is arranged in the channel, and wherein each of the guide members and corresponding channel are sized relative to each other to enable movement in the movement direction and motion of the curved projection in tangential directions relative to the central axis is prevented.

8. The shaving unit as claimed in claim 7, wherein each of the curved projections comprises a rounded end portion.

9. The shaving unit as claimed in claim 7, wherein each of the channels is formed between opposing side surfaces of a pair of guiding walls, and at least one guiding wall has a stop element, and wherein the supporting member comprises an abutment element for engagement with the stop element to define the second extended position of the supporting member relative to the base member.

10. The shaving unit as claimed in claim 1, wherein the guide elements are affixed to the base portion and the guide bush is positioned centrally between the hair-cutting units at a distance, in the movement direction, from the position wherein the guide elements are affixed to the base portion.

11. The shaving unit as claimed in claim 1, wherein the set of guide elements comprises a set of at least three guide elements arranged at regular angular intervals about the central axis.

12. The shaving unit as claimed in claim 11, wherein the at least two hair-cutting units comprise at least three hair-cutting units, and comprising a transmission unit which comprises at least three gear wheels, each of the at least three gear wheels being associated with a respective drive spindle for a respective one of the at least three hair-cutting units, and the gear wheels being disposed around the central axis, wherein each of the guide elements is positioned between a respective one of adjacent pairs of the gear wheels.

13. The shaving unit as claimed in claim 1, wherein the base portion comprises a base housing and a base frame attached to the base housing, wherein the base frame comprises a receiving channel for receiving the guide shaft, and also comprises the set of guide elements.

14. The shaving unit as claimed in claim 13, wherein the set of guide elements are arranged at feet of the frame by means of which the frame connects to the lower housing, and the guide shaft projects out of the receiving channel beyond a top of the frame.

15. An electric shaver comprising:

the main housing houses an electric motor; and the shaving unit as claimed in claim 1 coupled to the main housing.

* * * * *